United States Patent [19]

Hickman

[11] 3,918,736
[45] Nov. 11, 1975

[54] TANDEM AXLE SPRING SUSPENSION AND METHOD OF MAKING SAME

[75] Inventor: Albert F. Hickman, Eden, N.Y.

[73] Assignee: Hickman Developments, Inc., Eden, N.Y.

[22] Filed: July 22, 1974

[21] Appl. No.: 490,815

[52] U.S. Cl............................. 280/104.5 R; 180/71
[51] Int. Cl.².......................................... B60G 5/06
[58] Field of Search............. 280/104.5 R, 104.5 A; 180/73 TL, 73 TT, 71, 73 R

[56] References Cited
UNITED STATES PATENTS

| | | | |
|---|---|---|---|
| 3,193,303 | 7/1965 | Allison | 180/73 R |
| 3,301,573 | 1/1967 | Hickman | 280/104.5 R |
| 3,315,979 | 4/1967 | Chalmers | 280/104.5 R |
| 3,444,947 | 5/1969 | Stocks | 180/71 |

*Primary Examiner*—Philip Goodman
*Attorney, Agent, or Firm*—Harold I. Popp

[57] ABSTRACT

In the tandem axle trailer suspension shown in my U.S. Pat. No. 3,301,573, dated Jan. 31, 1967, walking beam ends are supported on the axle ends and are journalled at their centers on a cross shaft. The principal resilient support for the load is interposed between the cross shaft ends and the frame. The present invention adapts this suspension to automotive application in which at least the front axle has a conventional differential drive. In such adaptation, one torque arm and radius rod supplants the three conventionally provided to resist drive and brake torque reactions of a drive axle. This torque arm is fixed to and projects upwardly from one end of its drive axle housing and its radius rod projects horizontally lengthwise of the line of vehicle travel and is pivoted at one end to the upper end of the torque arm and at its other end to the frame. The present suspension is also particularly adapted for use in converting a conventional single axle leaf spring highway automotive truck into a tandem axle truck, using most of the original parts, including the original drive axle, its housing and wheels, and a part of the anchorage for the original leaf spring.

4 Claims, 6 Drawing Figures

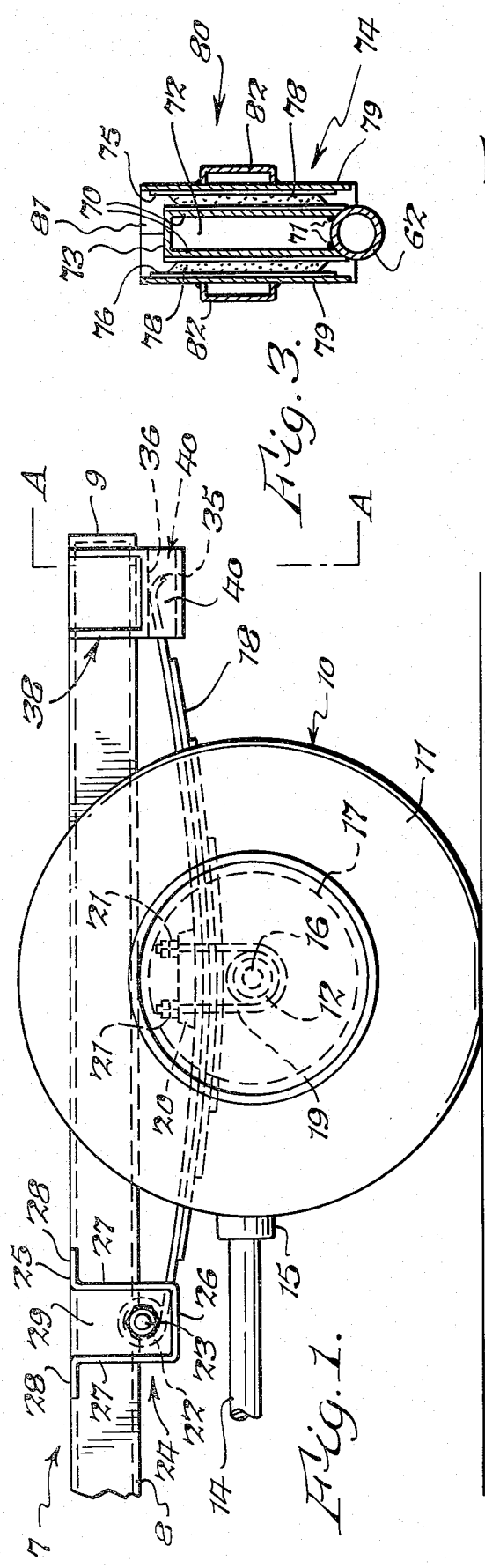
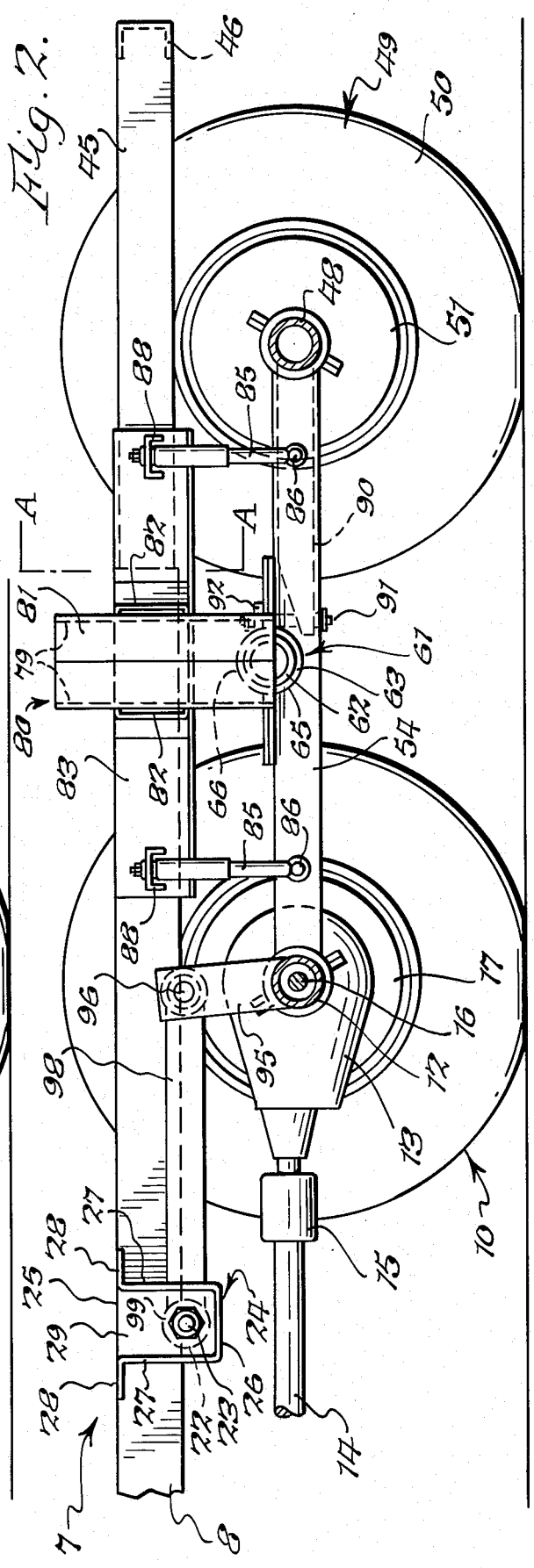

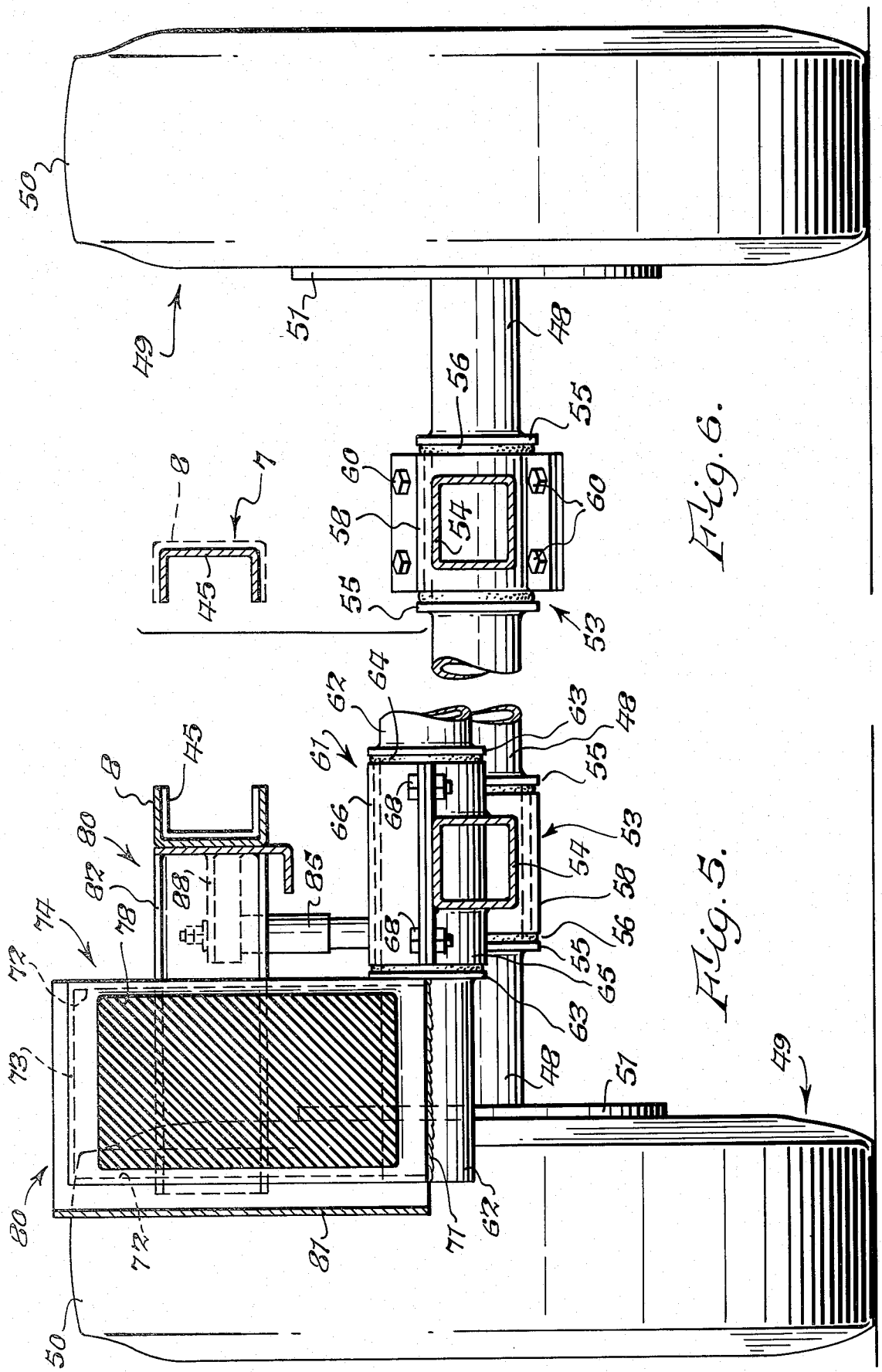

TANDEM AXLE SPRING SUSPENSION AND METHOD OF MAKING SAME

It is accordingly one of the objects of the invention to provide a vehicle spring suspension, including a drive axle, in which the drive and brake torque reactions of such drive axle are resisted by a single torque arm and radius rod, in contrast with the conventional three torque arms and radius rods heretofore required for such a drive axle.

It is another object of the invention to provide a tandem axle suspension replacing a conventional differential-drive single axle in which the majority of the parts, particularly the original differential-drive axle and wheels, are used in the tandem axle suspension.

Another object is to provide such a conversion tandem axle suspension which can be installed in replacement for the original differential-drive single axle suspension with a minimum of time, labor, additional parts, and modification of original structure.

Another object is to provide such a tandem axle suspension which retains the advantages of my said patented tandem axle suspension, namely; large vertical axle movement at low frequency and controlled by an increased resistance to motion in proportion to the amplitude and velocity of vertical main frame movement; resiliently resisted axle movement laterally of the frame to improve safety, tire wear, fuel mileage and stability; full axle compensation whereby excess load on one wheel is transmitted to its companion wheel on the same side of the vehicle; in which the moving parts are arranged inside and close to the wheels to provide a stable, high and wide support for the body; the use of rectilinear shear rubber springs and rubber bushings in supporting the load thereby to permit years and hundreds of thousands of miles of carefree service; easy accessibility and light weight, low cost components; and elimination of auxiliary side-sway control devices.

Other objects and advantages will be apparent from the following description and drawings in which:

FIG. 1 is a fragmentary side elevation of the rear end of an unladen single axle leaf spring truck preliminary to being converted into a tandem axle truck in accordance with my invention.

FIG. 2 is a similar view after its conversion into a tandem axle truck.

FIG. 3 is a vertical section taken generally on line 3—3, FIG. 4.

FIGS. 5 and 6 are fragmentary vertical sections taken generally on the correspondingly numbered lines, FIG. 4.

ORIGINAL FOUR WHEEL LEAF SPRING TRUCK

Figure 4:
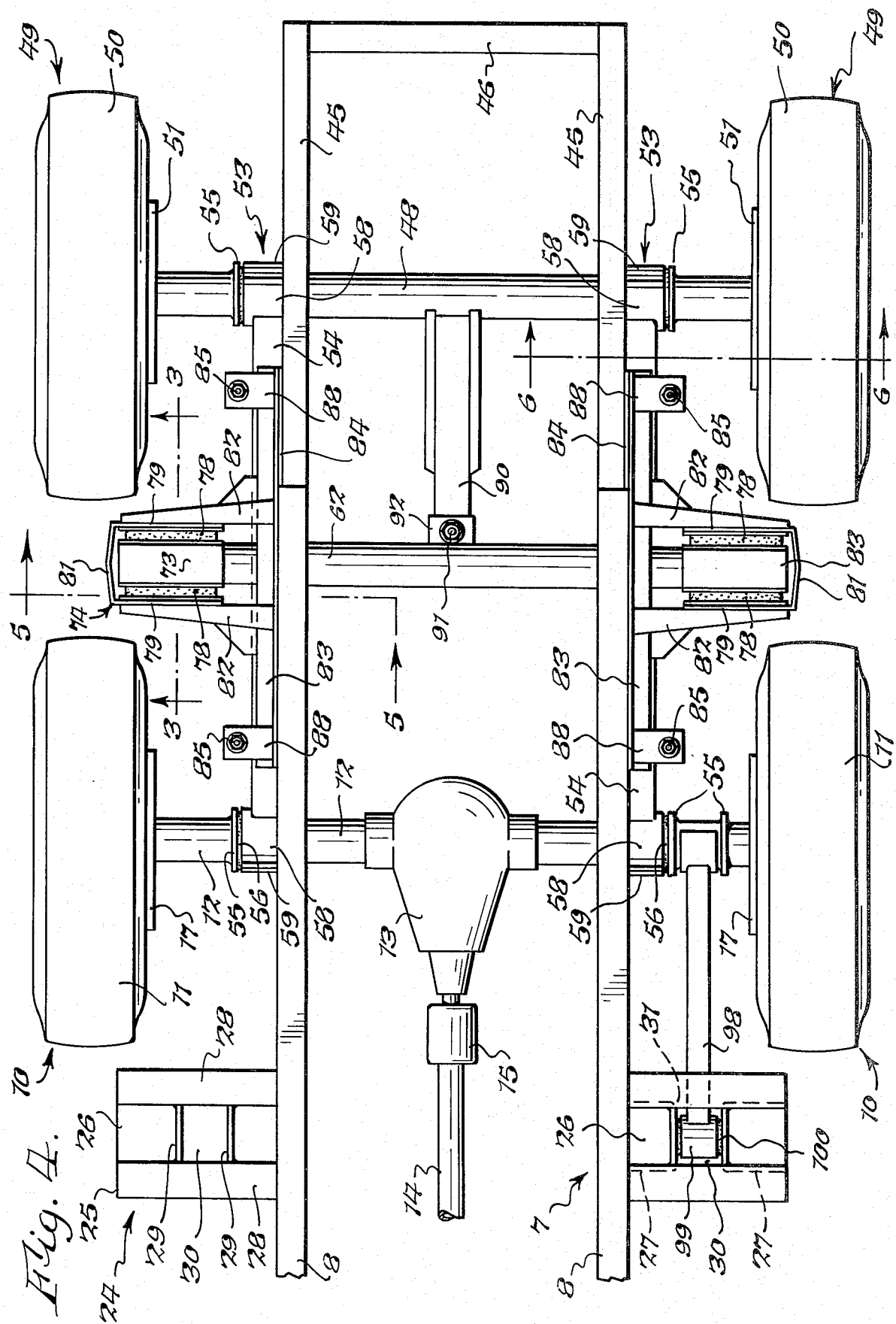
FIG. 4 is a fragmentary top plan view of the converted tandem axle truck shown in FIG. 2

While not limited to such use, the invention permits the conversion of the single drive axle, leaf spring truck shown in FIG. 1 into a tandem axle truck. This adds a pair of supporting wheels to the rear end of the truck. This is of advantage in permitting carrying heavier loads for which the single pair of drive wheels would have been inadequate. An example of such heavier loads would be a recreational camper body too heavy for a single pair of rear drive wheels.

This single drive axle or four wheel conventional truck shown in FIG. 1 has a frame or body 7 composed of a pair of spaced main longitudinal side frame bars 8 connected at their rear ends by a cross frame bar 9, these being in the form of inwardly facing channels.

The rear end of this frame 7 is supported by a pair of drive wheels 10, having rubber tires 11, and a conventional drive axle 12. As best shown in FIG. 2 and 4, this drive axle has a differential housing 13 for a differential (not shown) driven from a main drive shaft 14 through a flexible coupling 15. The drive axle 12 houses a pair of axle drive shafts 16 which transmit power from the drive shaft 14 and differential to the wheels 10. A conventional brake for each wheel is shown at 17, a simplified control of drive and brake torque reactions being a feature of the invention.

Each axle end supports the body or frame through a conventional leaf spring 18 bolted to its axle end by a U-bolt 19, the upstanding legs of which embrace and straddle its axle end and penetrate a block 20 against the top of which the nuts 21 of the U-bolt 19 are tightened. The top leaf of the forward end of each leaf spring 18 is formed to provide a knuckle or eye 22 which embraces a horizontal frame pivot pin 23. Each pivot pin 23 can be secured to the outside face of its main longitudinal side frame bar 8 by any suitable conventional bracket means 24. That shown is a horizontally elongated U-shaped bracket channel bar 25 welded at one upright U-shaped end to the outside face of its main longitudinal side frame bar 8 to project horizontally outwardly therefrom. Each bracket bar has a bottom wall 26 and upright side walls 27 from the upper edges of which horizontal top flanges 28 project. A pair of spaced vertical plates 29 is placed in each U-shaped channel bar 25 to extend parallel with the line of vehicle travel. Each is edge welded to the inside faces of the corresponding bottom wall 26 and upright side walls 27 to form a rectangular chamber 30. In front and rear of each chamber 30, the upright side walls are cut away to provide openings 31. Each pivot pin 23 extends through and is fixed to a corresponding pair of plates 29 to bridge its chamber 30. The knuckle 22 is thereby arranged in this chamber 30 and the forward end of each leaf spring 18 works in the corresponding opening 31.

The rear end of each leaf spring 18 is connected to the frame or body 7 in any conventional manner to permit the necessary horizontal elongation of the spring. For this purpose, the rear extremity of each spring is formed to provide an upwardly facing convex slipper end 35 which bears against the underface 36 of a horizontal channel bracket 38 welded to and projecting outwardly from the corresponding main longitudinal side frame bar 8. This slipper spring end 35 is confined against lateral displacement by a retaining channel 39, the upstanding legs 40 of which are welded to the under face of the channel frame bracket 38 to extend along opposite sides of the slipper spring end 35.

CONVERSION TO TANDEM AXLE SUSPENSION

The leaf springs 18 are removed and discarded. This is done by removing their eyes or knuckles 22 from the pins 23 and removing the U-bolts 19 which are also discarded. The slipper spring channel brackets 38 are also removed and discarded.

A usual purpose of the conversion is to accommodate a larger box body (not shown). For this purpose the rear extremities of the two main longitudinal side frame beams or channels 8 can be cut off, say, in a vertical plane designed by the line A—A. These rear extremities and their connecting cross frame bar or channel 9 are also discarded. An extension channel 45 can then be fitted in and welded to each main longitudinal side frame channel bar 8 to project rearwardly from the severed rear end thereof. The rear ends of extension channels 45 can be cross connected by a cross frame bar or channel 46.

The frame is now ready for the attachment of the tandem axle suspension which is preferably constructed as follows:

The numeral 48 represents a rear tandem axle which is supported at its opposite ends by wheels 49, these wheels being rotatably secured on the rear axle ends and including a tire 50. Each wheel 49 can also be equipped with a conventional brake 51.

The construction of the tandem axle spring suspension at the right hand side of the frame is substantially the same as at the left hand side of the frame and hence a description of the suspension at one side of the frame will be deemed to apply to both sides, the same reference numerals being employed.

The original axle 12 and its drive 14, 15, 16, is employed as the front tandem axle. Each end of each axle 12, 48 is connected by a rubber bushed bearing, indicated generally at 53, to one end of a horizontal walking beam 54, these rubber bushed bearings being each arranged adjacent the inner faces of the tires 11, 50.

Each walking beam 54 is preferably of rectangular tubular form in cross section having vertical side walls and horizontal top and bottom walls. While each rubber bushed bearing 53 can be of any suitable construction, as best shown in FIGS. 4–6, each is shown as comprising a pair of spaced end abutment rings 55 embracing and welded to each end of each axle 12, 48 and confining between them a rubber bushing 56 which embraces the axle. One half of the periphery of each rubber bushing is compressively embraced by a semicylindrical metal half bearing clamping member 58 and the other half of the periphery of each rubber bushing is compressively embraced by a semicylindrical half bearing clamping member 59, these half bearing clamping members 24, 25 having outwardly projecting flanges along their opposite longitudinal edges and which flanges are secured together by bolts 60 (shown only in FIG. 6) so as to compress the rubber bushing 56 between each pair of half bearing clamping members 58, 59. In order to accommodate the displacement of the rubber of the bushings 56 resulting from such compression the opposite ends of the half bearing clamping members 58, 59 are in spaced relation to the abutment rings 55 welded to each axle end. Each half bearing clamping member 58 is welded to the corresponding end of a companion walking beam 54. At its center, each walking beam 54 is connected by a rubber bushed bearing, indicated generally at 61 to a cross rod in the form of a cylindrical tube 62.

While each rubber bushed bearing 61 can be of any suitable construction, as best shown in FIGS. 2 and 5, each comprises a pair of spaced end abutment rings 63 welded to each end of the cross rod 62 and confining between them a rubber bushing 64 which embraces the cross rod. The bottom of the periphery of each rubber bushing 64 is compressively embraced by a semicylindrical metal lower half bearing clamping member 65 and the top of the periphery of each rubber bushing is compressively embraced by a semicylindrical upper half bearing clamping member 66, these half bearing clamping members 65, 66 having horizontally outwardly projecting flanges along their opposite longitudinal edges and which flanges are secured together by bolts 68 (shown only in FIG. 5) so as to compress the rubber bushing 64 between the half bearing clamping members 65, 66. In order to accommodate the displacement of the rubber of the bushings 64 resulting from such compression, the opposite ends of the half bearing clamping members 65, 66 are in spaced relation to the abutment rings 62 welded to each cross tube end.

Each lower half bearing clamping member 65 is set into and welded to the center of the companion walking beam 54. The opposite ends of the cross rod 62 resiliently support the main longitudinal side frame bars 8 of the main frame 7.

Each end of the cross tube 62 resiliently supports the corresponding main longitudinal side frame bar 8. To this end a pair of vertical rectangular metal plates 70 are welded along their lower edges, as indicated at 71, to each end of the cross tube 62 to project upwardly in parallel, spaced relation to each other and to the vertical plane intersecting the axis of the cross tube 62. The vertical and top edges of each pair of these plates 70 can be cross connected by vertical and horizontal plates 72 to provide a parallel sided box-like structure fixed to and rising from each end of the cross tube 62.

A rectilinear movement sheer rubber spring, indicated generally at 74, is interposed between each plate 70 and the vehicle frame 7. Each spring comprises a pair of rectangular metal plates 75, 76 to the opposing faces of which is vulcanized a rectangular rubber body 78. One plate 75 of each spring is suitably secured to the exterior face of each plate 70 of the box-like structure rising from each end of the cross tube 62. The other plate 76 of each shear rubber spring is suitably secured to the vertical rectangular plate 79 of a frame bracket 80. The outer vertical edges of each pair of these plates 79 can be cross-connected by a vertical plate 81. A pair of spaced wedge-shaped arms 82, of channel form in cross section, project horizontally outwardly from an angle bar 83 secured to the outside vertical face of each main longitudinal side frame bar 8 in position to embrace the exterior faces of the corresponding pair of plates 79 to which they can be fixed in any suitable manner as by the welding shown in FIG. 3. For strengthening, an upright rectangular plate 84 can be interposed betweem the vertical faces of the rear end of each angle bar 83 and the companion extension channel bar 45.

Upright telescopic shock absorbers 85 are interposed between each end of each walking beam 54 and the frame 7. To this end the lower section of each shock absorber is suitably secured, as indicated at 86, to one end of a walking beam 54 and the upper end to a frame bracket 88 fixed to and projecting horizontially outwardly from each end of the angle bar 83.

Brake torque of the rear axle 48 can be resisted by a conventional torque arm 90 welded to the center of the rear axle 48 to project horizontally forwardly therefrom. The front end of this torque arm 90 is pivotally connected to the lower end of a vertical radius rod 91. Th upper end of this radius rod is pivotally connected to a bracket 92 fixed to and projecting horizontally rearwardly from the center of the cross tube 62.

It is apparent that this single torque arm 90 and radius rod 91 cannot be applied to the front axle 12 because the differential housing 13 and drive shaft 14 are in the way. Nor could such a single torque arm and radius rod be applied to the rear axle 48 if it were a drive shaft axle because the then necessary differential housing and drive shaft would again be in the way. Conventionally three torque arms and radius rods are required for each drive axle, the torque arms and radius rods of each axle being in parallelogram relation to one another.

I have discovered that a single torque arm and radius rod can be used to resist properly the drive and brake torque reactions of a drive axle, regardless of whether a single drive axle or one or both drive axles of a pair of tandem axles. To accomplish this, an upstanding torque arm 95 is welded at its lower end to one end of the drive axle 12. With the present conversion tandem suspension, the position of the upstanding torque arm 95 is such that its upper end is horizontally in line and in rear of one frame pivot pin 23 originally used to connect with the forward knuckle 22 of one leaf spring 18. This upper end of the single torque arm 95 is pivotally connected, as indicated at 96, to the rear end of a horizontal radius rod 98. The forward end of this radius rod is formed to provide a knuckle 99 which is connected, via a rubber bushing 100, to the corresponding pin 23 originally used for the forward end of a leaf spring 18.

OPERATION

In the operation of the suspension the inward movement of one end of, say, the front tandem axle 12 through the corresponding rubber bushed bearing 53 effects upward movement of the forward end of the corresponding walking beam 54.

This upward movement of the forward end of this walking beam 54 raises its rock sleeve 65, 66 of its rubber bushed bearing 61 (FIGS. 2 and 5) at the center of the walking beam and which is journalled through the rubber bushing 64 on the corresponding end of the cross rod 62. This rubber bushing 64 is of sufficient radial thickness to permit the required rocking of the walking beam 54 and provides a frictionless bearing which is free from lubrication requirements. The two rubber bushings 64 hold the walking beams at the outer ends of the cross rods 62, but permit a limited amount of cushioned horizontal transverse movement of the ends of the walking beams 54 relative to the cross tube 62 but engage the welded rings 63 to prevent any such movement to excess.

This upward movement of one end of the cross rod 62 raises the corresponding upstanding box-like plate structure 70, 72 fixed to this end of the cross rod. This raises the upright side plates 75 thereby to distort upwardly the opposing sides of the corresponding pair of rubber bodies 78. Accordingly this force is transmitted to the frame bracket 80 through these rubber bodies which are distorted to provide resilient support for the frame 8. The rebound force of the bodies 78, of course, restores the forward wheel to its original position and in this rebound action the corresponding shock absorber 85 is effective to retard such rebound action.

It will be noted that this action of the suspension is friction free, the force being transmitted from the axles to the walking beams 54 via the rubber bushings 56; the force from each walking beam 54 being transmitted to the cross rod 62 via the corresponding rubber bushing 64; and the force from each end of the cross rod 62 being transmitted to the axle bracket 80 via the rubber bodies 78.

Lateral cushioning of the axles 12, 48 is provided by their individual rubber bushings 56, the rock sleeves 58, 59 surrounding these rubber bushings being spaced axially from the rings 55 welded to the axles, and lateral axle movement is also permitted by the rubber sleeves 64 carrying the cross rod 62 and which permit limited lateral movement of the outboard ends of the walking beams 54. Lateral cushioning of the axles is also provided by the rubber bodies 78 which permit a limited lateral or axial movement of the cross rod 62 supporting these axles.

As to the problems involved in conjunction with the control of drive and brake torque reactions of the drive axle 12 by the single torque arm 95 and radius rod 98, it will be appreciated that any such control must not interfere with the wheel at one end of the axle rising and tilting the axle. It also should not interfere with the limited cushioned movement of the axle both transversely and longitudinally of the line of vehicle travel provided by the rubber springs and bushings in the suspension shown. Also it could not be located at the center of the axle, as with the torque arm 90 and radius rod 91 for the rear axle 48, because the differential housing is in the way. Also the torque arm must be of substantial length to be effective.

To meet these requirements, the single torque arm 95 at one end only of the drive axle 12 must be generally upright during its operation. To be of adequate length it must also be unstanding in order to provide road clearance. It is also essential that the radius rod be generally horizontal during its operation to have minimum effect on road induced axle movements. For the same reason, it is also essential that the radius rod 98 have substantial length. These requirements are met by the single torque arm-radius rod arrangement 95, 98 shown. Conventionally three torque arms and radius rods in parallelogram arrangement have been required to service a drive axle.

By "rubber" as used in the accompanying claims is meant natural rubber, synthetic rubber, or a mixture thereof, and by "wheel" is meant the ground engaging means 10, 49 whether in the form of the single wheels shown, or dual wheels.

What is claimed is:

1. A tandem axle spring suspension adapted to be interposed between a pair of tandem axles having rubber tired wheels journalled at the ends thereof, the forward of said axles being a drive axle provided with a central differential gear housing, drive shafts transmitting power through the differential gear to the companion pair of wheels, and brake means betweem the drive axle and its wheels, the suspension also including a walking beam arranged at each side of said frame and extending lengthwise thereof close to the inner vertical faces of the corresponding pair of tires, a horizontal cross rod extending transversely of said frame with its ends projecting beyond the sides of said frame toward the spaces between the tires, bearing means journalling said cross rod on the central parts of said walking beams, and means movably connecting each end of each walking beam with a corresponding axle end, wherein the improvement comprises means controlling movement of said axles relative to said frame comprising a cross rod bracket secured to each end of said cross rod and having upright faces facing in opposite directions fore-and-aft of the cross rod, frame bracket means connected to said frame and having upright faces severally opposing the corresponding faces of said cross rod brackets, a rectilinear movement shear rubber body secured at its opposite upright faces to each companion pair of upright faces of said cross rod brackets and said frame bracket means and each being distorted in upright shear in resiliently supporting each frame bracket on its cross rod bracket, said shear rubber bodies permitting vertical movement of said axles and also controlling the movement thereof horizontally both lengthwise and transversely of the line of vehicle movement, a single torque arm fixed to and projecting upwardly from one end only of said forward drive axle, a generally horizontal radius rod pivotally connected at one end to its upper end of said torque arm and extending lengthwise of the line of vehicle travel, and means pivotally connecting the other end of said radius rod to said frame, said single torque arm and radius rod at one end only of said forward drive axle forming the sole linkage means resisting brake and drive torque reactions of said forward drive axle.

2. A tandem axle vehicle spring suspension as set forth in claim 1 wherein said torque arm and radius rod is arranged in the space between one drive wheel and the frame.

3. The method of converting a single rear axle drive vehicle into a tandem rear axle vehicle, the single rear drive axle having rubber tired wheels journalled at the ends thereof and also being provided with a central differential gear housing, drive shafts transmitting power through the differential gear to said wheels, and brake means interposed between such axle and said wheels, the single rear drive vehicle also including a frame, leaf springs connected intermediate their ends to the opposite end of said single rear drive axle, a bracket connecting the front end of each leaf spring to the frame, and means supporting said frame on the rear end of each leaf spring, wherein the invention comprises removing said leaf springs from said single rear drive axle and frame, extending said frame rearwardly, journalling the front ends of a pair of walking beams on the opposite ends of said single rear drive axle, journalling the rear ends of said walking beams on the opposite end of a tandem axle having rubber tired wheels journalled at the ends thereof, journalling a cross rod on the central parts of said walking beams with its ends projecting toward the spaces between the rubber tired wheels, attaching a pair of upright plates to each end of said cross rod to face in opposite directions fore-and-aft of the vehicle, attaching a frame plate to said frame to face each such upright plate in spaced, generally parallel relation thereto, and attaching a vertically flexible shear rubber body between and to each pair of said spaced, generally parallel plates.

4. The method of converting a single rear axle drive vehicle to a tandem rear axle vehicle as set forth in claim 3 including the additional steps of attaching a brake and drive torque reaction arm to rise from one end only of said single torque reaction arm to rise from one end only of said single rear drive axle, and pivotally connecting the upper end of said torque arm with said bracket formerly connecting the front end of the corresponding leaf spring to the frame.

* * * * *